(12) United States Patent
Okuyama

(10) Patent No.: US 6,300,741 B1
(45) Date of Patent: Oct. 9, 2001

(54) SPEED CONTROLLING METHOD FOR INDUCTION MOTOR

(75) Inventor: Toshiaki Okuyama, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/654,088

(22) Filed: Sep. 1, 2000

(30) Foreign Application Priority Data

Feb. 24, 2000  (JP) .................................................. 12-052256

(51) Int. Cl.⁷ ...................................................... H02P 7/628
(52) U.S. Cl. .......................... 318/799; 318/801; 318/809
(58) Field of Search ................................... 318/798–802, 318/804, 805, 807–811

(56) References Cited

U.S. PATENT DOCUMENTS

| | | | |
|---|---|---|---|
| 4,451,771 | * | 5/1984 | Nagase et al. ........................ 318/800 |
| 5,652,495 | * | 7/1997 | Narazaki et al. ..................... 318/716 |
| 5,877,607 | * | 3/1999 | Masaki et al. ........................ 318/807 |
| 5,959,430 | * | 9/1999 | Yuki et al. ............................ 318/805 |
| 6,014,007 | * | 1/2000 | Seibel et al. ......................... 318/805 |
| 6,184,648 | * | 2/2001 | Kato et al. ........................... 318/811 |

OTHER PUBLICATIONS

The Transactions of the Institute of Electrical Engineers of Japan, vol. 110–D, No. 5, May, 1990, pp. 477–486.

* cited by examiner

*Primary Examiner*—Bentsu Ro
(74) *Attorney, Agent, or Firm*—Antonelli, Terry, Stout & Kraus, LLP

(57) ABSTRACT

A system for controlling the speed of an induction motor by controlling an output voltage and an output frequency of a power inverter in accordance with a speed command includes a computing unit 10 for determining a slip-frequency computed value $\omega s2$; an adder 11 for outputting a slip-frequency estimated value $\omega s\hat{}$; an adder 12 for adding $\omega s\hat{}$ to a speed command value $\omega r^*$ and outputting $\omega 1^*$; a d-axis current commanding unit 14 for outputting a d-axis current command value $id^*$ which is a value greater than a normal value; an amplifier 15 for outputting a voltage command value $ed^*$; a gain commanding unit 16 for commanding a gain Gd; a q-axis current limiter 17 for controlling a q-axis current iq substantially to zero in a zero speed range; and a gain commanding unit 18 for commanding a gain Gq.

20 Claims, 10 Drawing Sheets

SPEED CONTROLLING METHOD FOR INDUCTION MOTOR

BACKGROUND OF THE INVENTION

The present invention relates to a speed controlling method for an induction motor, and more particularly to a technique of vector control without a speed sensor which does not require a speed sensor mounted on a motor and makes it possible to obtain high torque starting from a zero speed range.

As a method of controlling the speed of an induction motor, a method of vector control without a speed sensor is conventionally known. FIG. 14 shows a configuration of its control system. Reference numeral 1 denotes an induction motor; 2 a power inverter for outputting an output voltage proportional to a voltage command value V1*; 3 a coordinate transformer for effecting the coordinate transformation of inverter output currents iu and iw and computing d-axis and q-axis currents id and iq; 4 a voltage computing unit for computing a value of a leak-impedance voltage drop of the motor on the basis of id, iq and an output frequency command value ω1*; 5 and 6 adders for adding the voltage drop value to induced-electromotive-force command values ed* and eq* and outputting d-axis and q-axis voltage command values Vd* and Vq*; 7 a phase reference generator for integrating ω1* and outputting a phase reference θ; 8 a coordinate transformer for outputting an inverter output voltage command value V1* (three phase) on the basis of Vd* and Vq*; 9 computing unit for outputting a slip-frequency computed value ωs1 on the basis of id and iq; 12 an adder for adding ωs1 to a speed command value ωr* and outputting ω1*; and 13 an electromotive-force computing unit for computing eq* on the basis of ω1*.

It should be noted that "Okuyama, et al.: "Simplified Vector Control System without Speed and Voltage Sensors—Effects of Setting Errors in Control Parameters and their Compensation" The Transactions of The Institute of Electrical Engineers of Japan, Vol. 110-D, No. 5, May, 1990, pp. 477–486 is known as a related document.

SUMMARY OF THE INVENTION

In the above-described configuration, the operating frequency ω1 of the motor 1 is controlled in proportion to ω1*, and the drop in the leak impedance is compensated by the action of the voltage computing unit 4. As a result, the induced electromotive force e of the motor 1 does not change irrespective of the magnitude of the torque. Hence, the magnetic flux of the motor is always kept constant, and a decline in the torque due to a decline in the magnetic flux of the motor is prevented. At this time, since iq is proportional to the slip frequency ωs, as the computing unit 9 estimates ωs in accordance with the following Formula (1), and adds it to ωr* to compute ω1*, the variation of the real rotational speed ωr due to a change in the slip (torque) is compensated.

$$\omega s = 1/T2 \cdot iq/id \quad (1)$$

However, in cases where actual values r1 and Lσ of the motor parameters vary from reference values r1* and Lσ* of the motor parameters used in the voltage computing unit 4, the magnetic flux of the motor varies in correspondence with the torque. Consequently, a decline in the torque occurs (the torque fails to be proportional to the current). In addition, since iq and ωs are not proportional, Formula (1) is not valid, so that the accuracy of the aforementioned compensation for the speed variation deteriorates.

Generally, a decline in the torque and the deterioration of the speed accuracy are noticeable in the zero speed range and its vicinity.

Accordingly, it is an object of the present invention to provide a speed controlling method for an induction motor which does not undergo a decline in the torque in the zero speed range and is suitable for effecting regenerative operation stably.

To attain the above object, if a speed command value is equal to or less than a predetermined value, a d-axis current id is increased to a value greater than a normal value, and a voltage command value is controlled by being changed in accordance with a q-axis current iq so that iq approaches zero.

DESCRIPTION OF THE EMBODIMENTS

Figure 1:
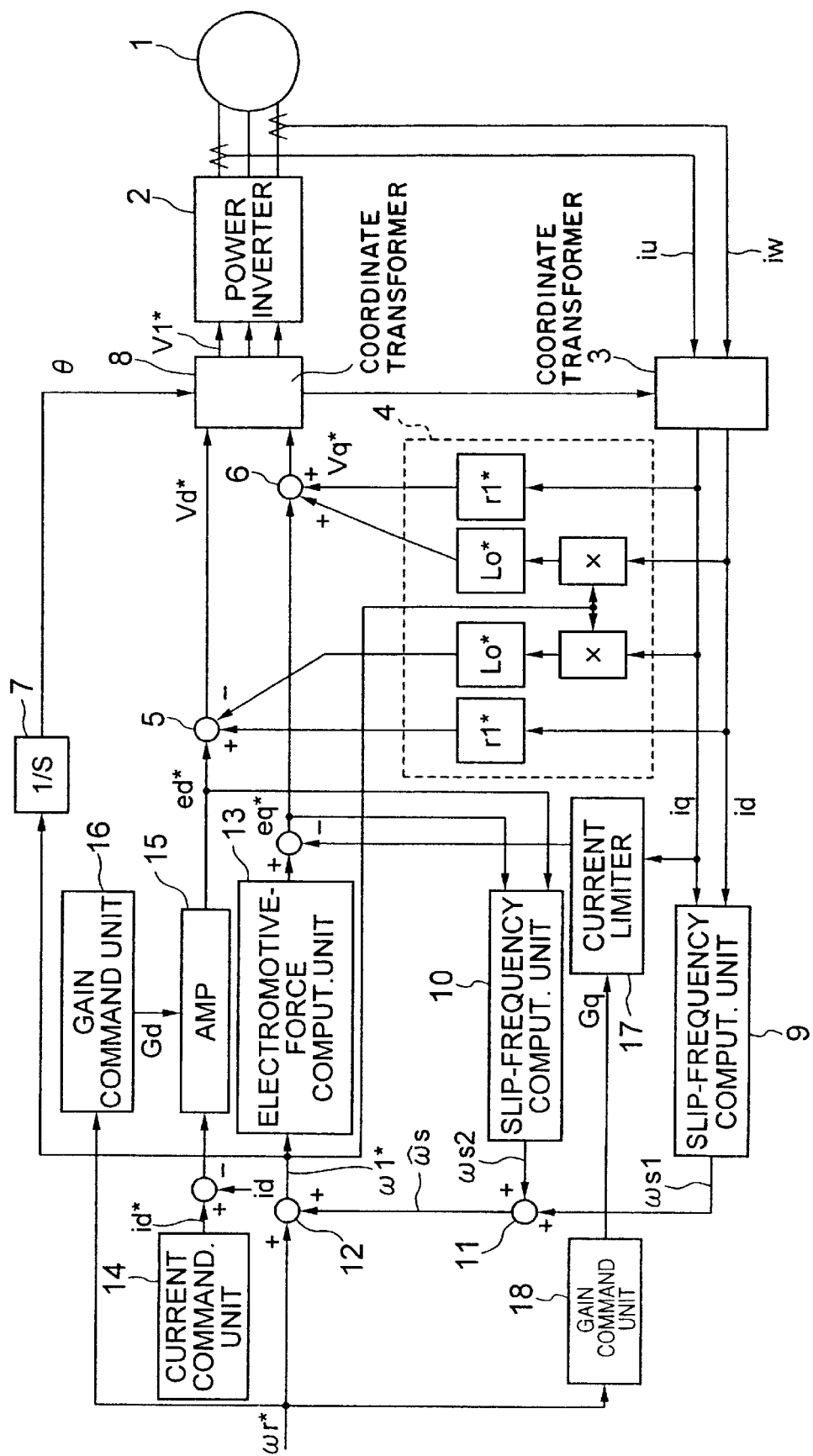
FIG. 1 is a block diagram of a vector controlling apparatus without a speed sensor for realizing the speed controlling method for an induction motor in accordance with a first embodiment of the invention.

Referring now to the drawings, a description will be given of the embodiments of the invention.

FIG. 1 shows a block diagram of a vector controlling apparatus without a speed sensor for realizing the speed controlling method for an induction motor in accordance with an embodiment of the invention. Reference numerals 1 to 9, 12, and 13 denote constituent elements which are identical to those of the conventional example.

Reference numeral 10 denotes a computing unit for determining a slip-frequency computed value ωs2 on the basis of induced-electromotive-force command values ed* and eq*; 11, an adder for adding the aforementioned ωs1 and ωs2 and outputting a slip-frequency estimated value ωs^; 12, an adder for adding ωs^ to ωr* and outputting ω1*; 14, a d-axis current commanding unit for outputting a d-axis current command value id* which is greater than a normal value; 15, an amplifier for outputting a voltage command value ed* in accordance with a deviation between id* and id, a gain Gd being adapted to change in accordance with ωr*; and 16, a gain commanding unit for commanding the gain Gd. Numeral 17 denotes a q-axis current limiter for controlling iq substantially to zero in a zero speed range, a gain Gq being adapted to change in accordance with ωr*. Numeral 18 denotes a gain commanding unit for commanding the gain Gq.

Figure 2:
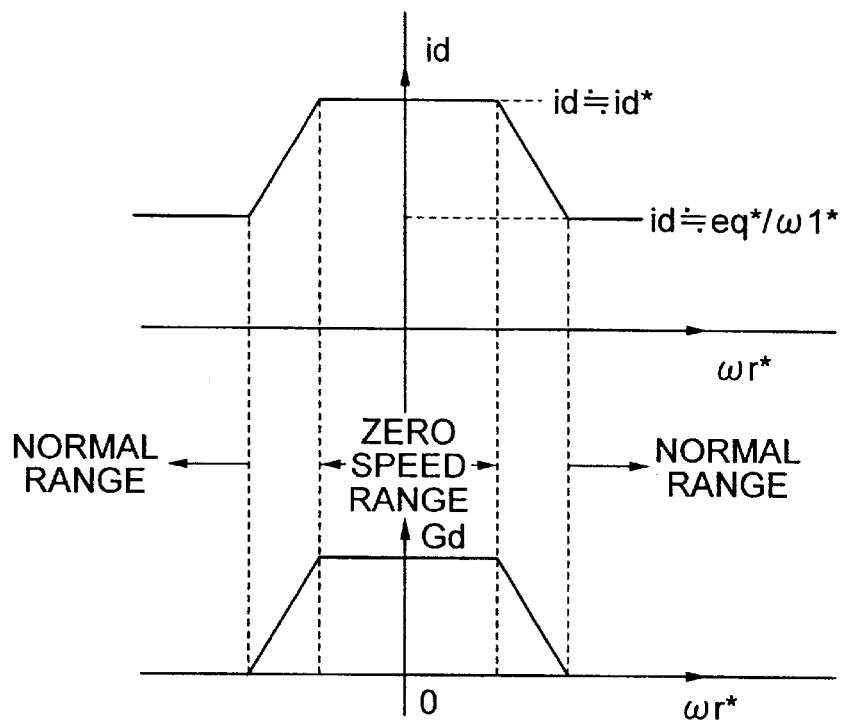
FIG. 2 is a diagram useful for explaining the operation of the apparatus shown in FIG. 1.

Next, a description will be given of the operation of the overall system. The operation of the constituent elements 1 to 9, 12, and 13 is the same as described above in the section on the related art. The present invention has as its object to prevent a decline in the torque due to variations of motor parameters in the conventional art, and the constituent elements designated at reference numerals 10, 11, and 14 to 18 constitute a characteristic configuration of the present invention. The constituent elements 14 to 16 are for controlling the d-axis current id to a predetermined value greater than a normal value in the zero speed range, and a deviation between the command value id* from the d-axis current commanding unit 14 and the detected value id from a coordinate transformer 3 is amplified by the amplifier 15, and ed* is outputted. In ranges other than the zero speed range, the output ed* from the amplifier 15 is controlled so as to approach zero in accordance with the gain command Gd from the gain commanding unit 16. FIG. 2 shows the relationship among the gain command Gd, the d-axis current id, and the speed command value ωr*.

Figure 3:
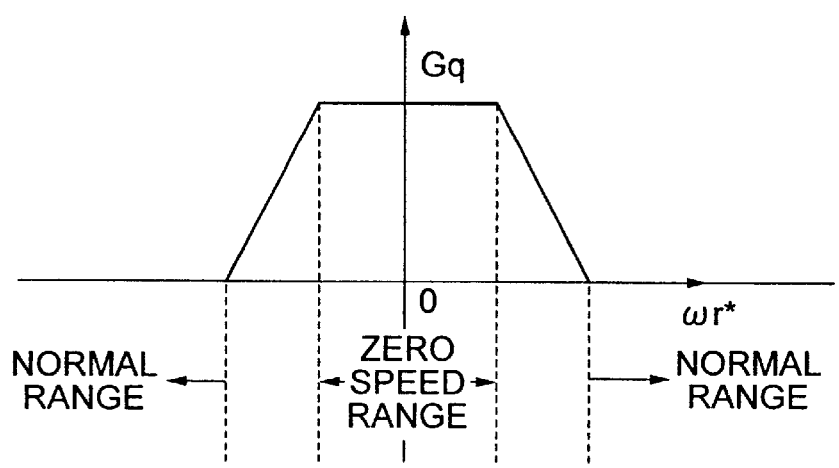
FIG. 3 is a diagram useful for explaining the operation of the apparatus shown in FIG. 1.

Meanwhile, in the zero speed range, eq* is corrected by the current limiter 17 to control iq substantially to zero. The input-output relation of the commanding unit 18 is shown in FIG. 3. Since the gain Gq assumes a large value in the zero speed range, eq* is corrected by an output value Gq·iq of the q-axis current limiter 17 in a direction for suppressing iq. Consequently, iq is controlled substantially to zero.

Figure 4:
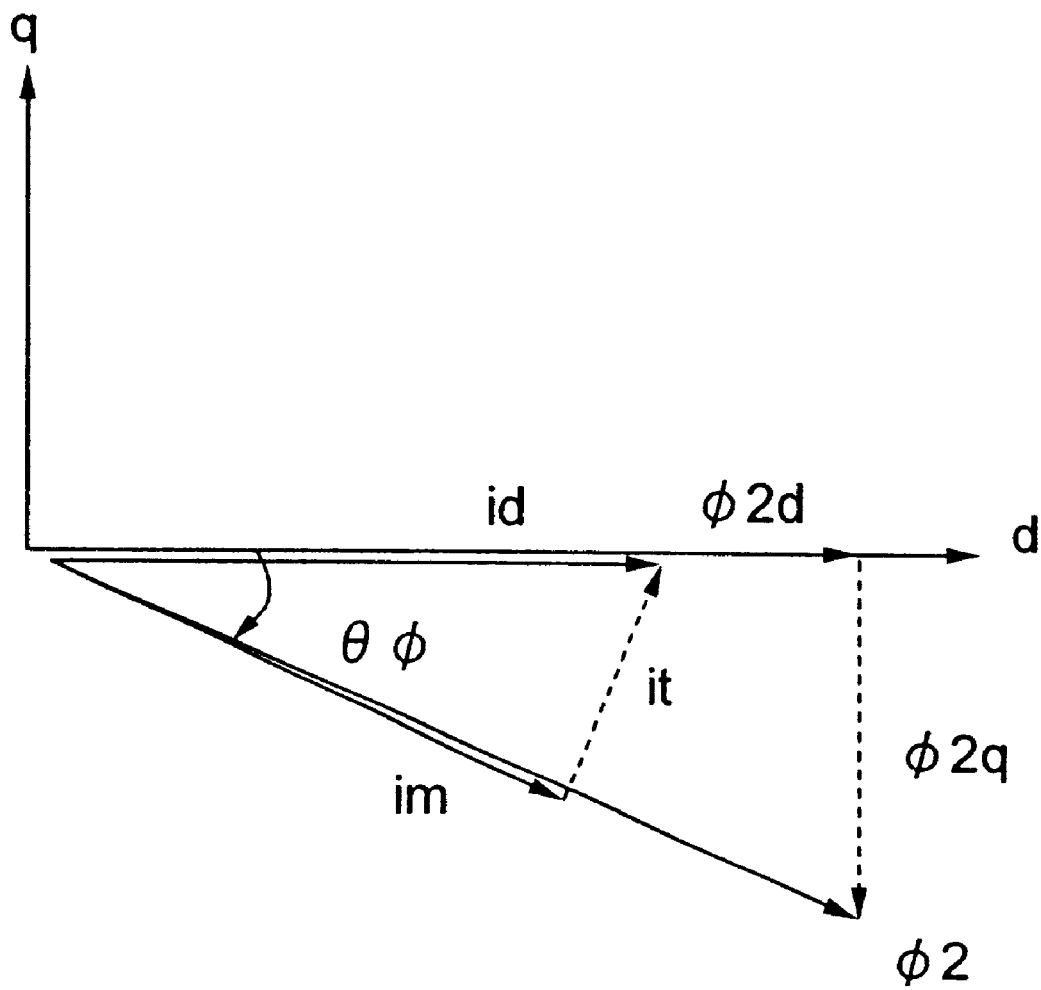
FIG. 4 is a vector diagram of the motor useful for explaining the operation of the apparatus shown in FIG. 1.

A vector diagram concerning the current and magnetic flux of the motor is shown in FIG. 4. The motor generated torque t is shown by the following Formulae (2) and (3):

$$\tau = k(\phi 2d \cdot iq - \phi 2q \cdot id) \quad (2)$$
$$= -k\phi 2q \cdot id$$

where iq=0, 2q<0 (motor-driven operation), and k is a proportional coefficient.
Or, $$\tau = kM \cdot im \cdot it \quad (3)$$
$$= kM(id^2/2) \cdot \sin(2 \cdot \theta \phi)$$

where θφ is an angle formed by the magnetic flux φ2 and the current id, and M is exciting inductance.

From Formula (3), at 2·θφ=90°, torque assumes a maximum value proportional to an $id^2$ value, and the torque changes from positive to negative in the range of −45°≦θφ≦45°. Namely, an entire range covering motor-driven operation and regenerative braking can be controlled uniformly. In addition, in this case, the motor generated torque changes in accordance with θφ, and is not affected by motor parameters r1 and Ls. Namely, in accordance with the controlling method of the invention, even in a case where there are variations in the motor parameters, a decline in the torque does not occur in both motor-driven operation and regenerative braking.

In the aforementioned zero speed range, a real slip frequency ωs is expressed by the following Formula (4):

$$\omega s = 1/T2 \cdot it/im \quad (4)$$
$$= -1/T2 \cdot \phi 2q/\phi 2d$$

As shown in Formula (4), the relational expression differs from the case for the normal range (Formula (1)). For this reason, in the zero speed range, the slip-frequency computed value ωs2 is computed by the computing unit 10 by using ed* and eq* in accordance with the following Formula (5):

$$\omega s2 = 1/T2 \cdot ed^*/eq^* \quad (5)$$

where $ed^* \approx -\omega r \cdot \phi 2q$
$eq^* \approx \omega 1 \cdot \phi 2d$ Throughout the entire range including the zero speed range and the normal ranges, ωs1 and ωs2 are added by the adder 11, and ωs^ shown in the following Formula (6) is outputted.

$$\omega s\hat{} = 1/T2 \cdot iq/id + 1/T2 \cdot ed^*/eq^* \quad (6)$$

In the zero speed range, Formula (6) agrees with Formula (5) since 1q≈0, and in the normal range Formula (6) agrees with Formula (1) since ed*≈0.

Since ωs^ is added to ωr* to effect slip compensation, the real rotational speed ωr is kept constant even if the slip (torque) varies, so that speed control can be effected with high accuracy.

It should be noted that, in the range where φ2q does not change greatly, eq* can be regarded as being proportional to ω1, so that the computation can be performed by using ω1* instead of eq* in Formula (6). In addition, it is possible to use not only ω1* but also ωr*.

Figure 5:
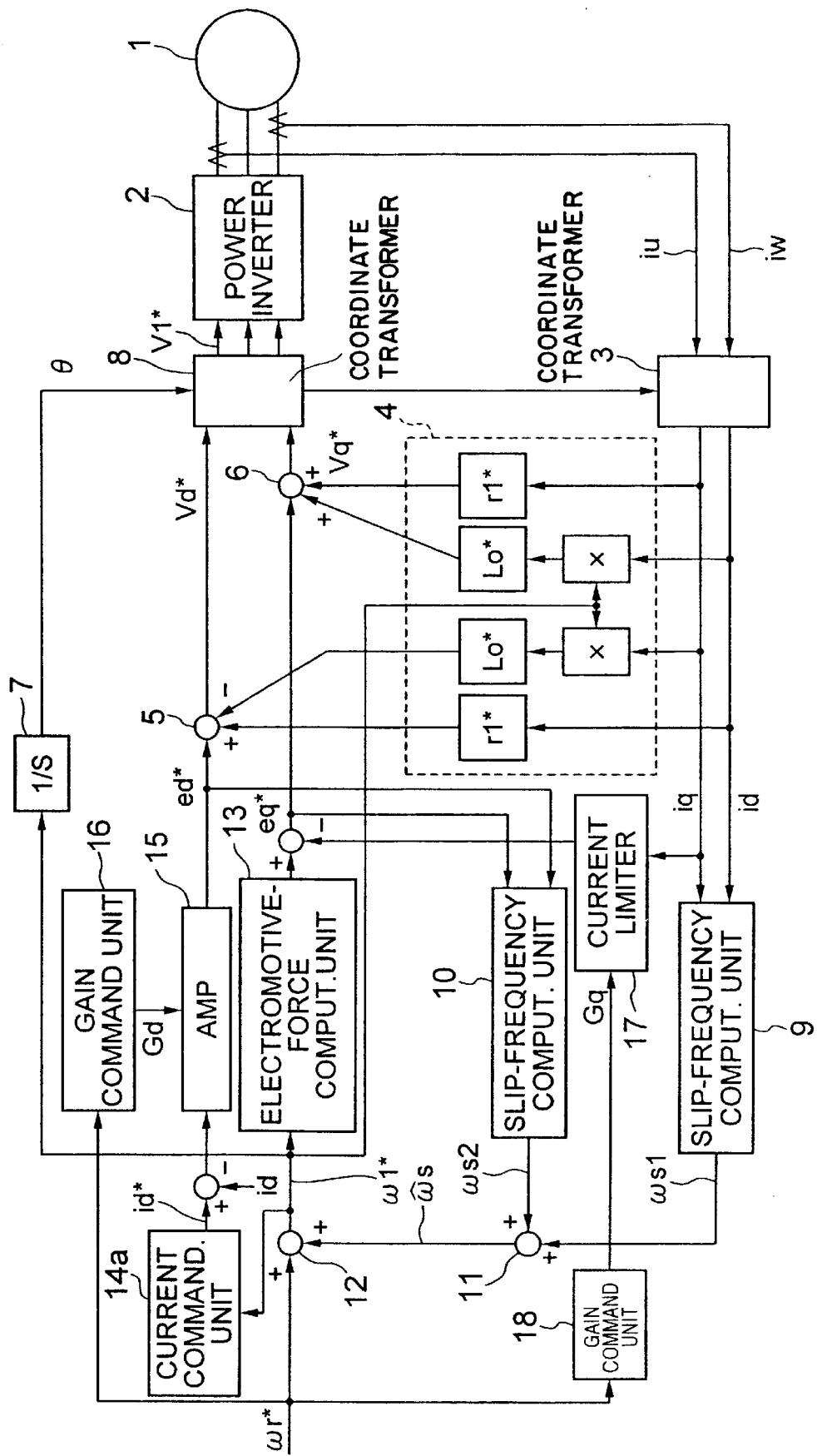
FIG. 5 is a block diagram of the vector controlling apparatus without a speed sensor for realizing the speed controlling method for an induction motor in accordance with another embodiment of the invention.
Figure 6:
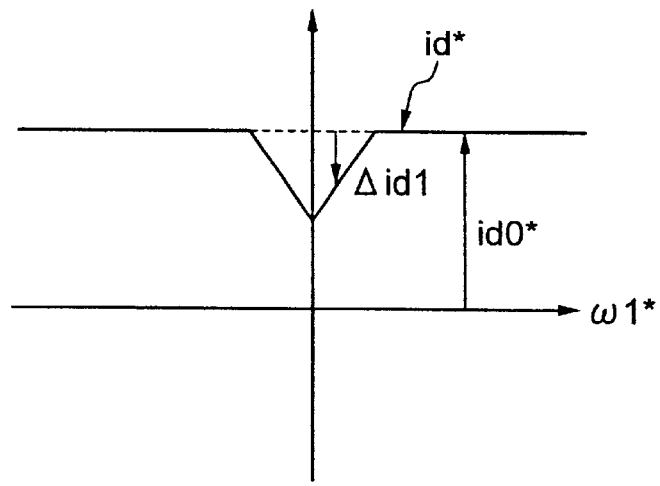
FIG. 6 is a diagram useful for explaining the operation of the apparatus shown in FIG. 5.

FIG. 5 shows another embodiment of the present invention. The difference with the embodiment shown in FIG. 1 lies in that id* is decreased at ω1*≈0, and the relationship between ω1* and id* is shown in FIG. 6.

Figure 7:
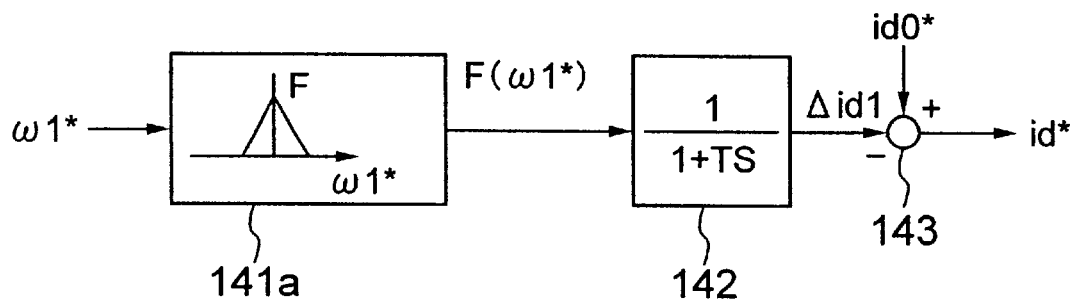
FIG. 7 is a diagram useful for explaining the content of an arithmetic operation by a d-axis current commanding unit in the apparatus shown in FIG. 5.

At ω1*=0, since the state of conduction does not shift between elements of the inverter, and a current is concentrated on particular elements, it is necessary to limit the inverter output current in comparison to a normal level. The content of the computation by a current commanding unit 14a is shown in FIG. 7. The computation shown in the following Formula (7) is performed by a function generator 141a, a delay circuit 142, and an adder 143, and id* having the relationship shown in FIG. 6 is outputted.

$$Id^* = id0^* - \Delta idi \quad (7)$$
$$= id0^* - 1/(1 + TS) \cdot F(\omega 1^*)$$

It should be noted that the delay circuit 142 is for taking into consideration the transient withstand capacity (a delay in the temperature rise) of the elements with respect to the concentration of the current, and id0* is a reference value in a case where there is no concentration of the current.

The configuration of constituent elements other than the current commanding unit 14a is the same as that of the embodiment shown in FIG. 1, and their operation is also the same.

It should be noted that, in the range in which φ2d does not change greatly, eq* can be regarded as being proportional to ω1, so that the computation can be performed by using ω1* instead of eq* in Formula (8). In addition, it is possible to use not only ω1* but also ωr*.

Figure 8:
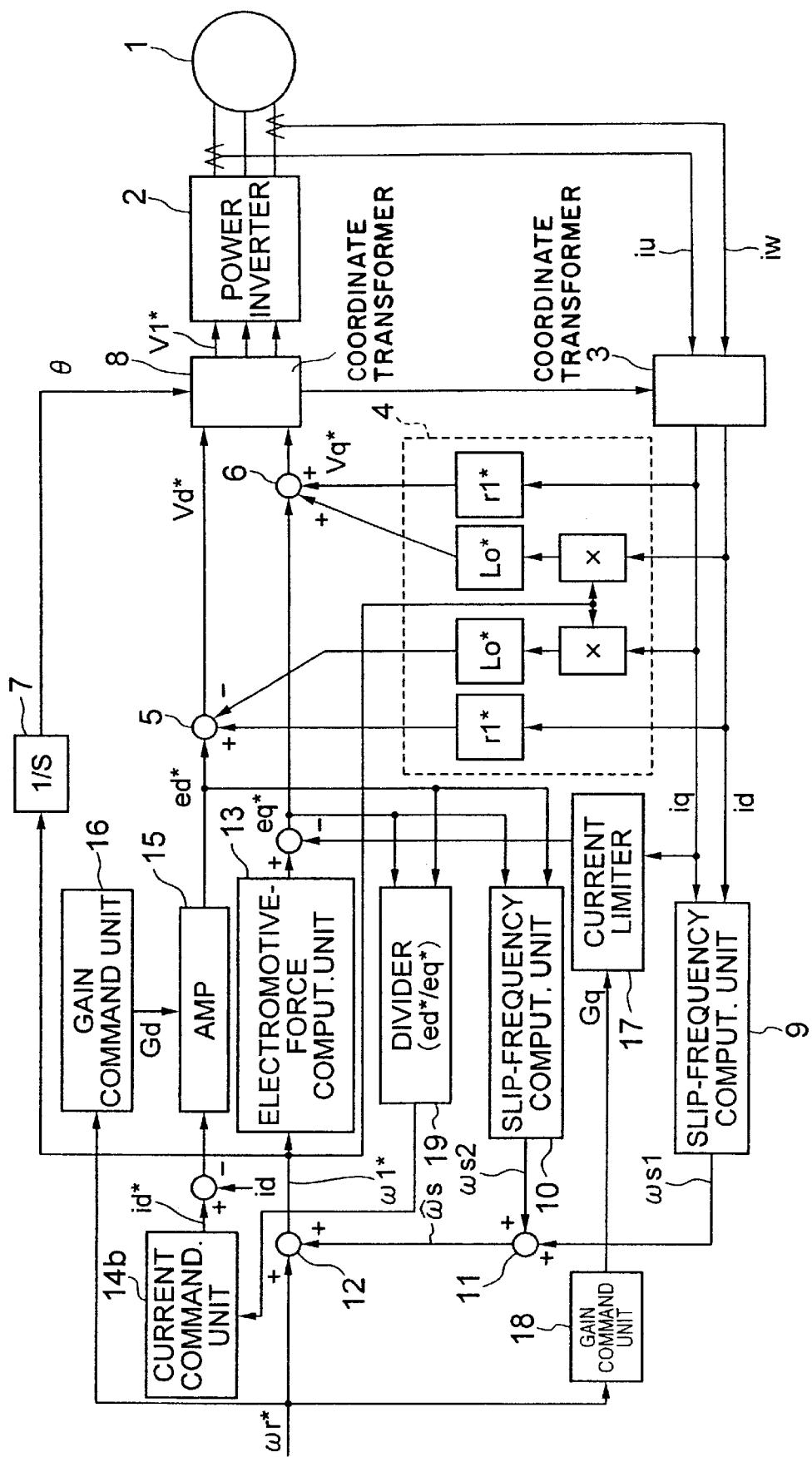
FIG. 8 is a block diagram of the vector controlling apparatus without a speed sensor for realizing the speed controlling method for an induction motor in accordance with still another embodiment of the invention.
Figure 9:
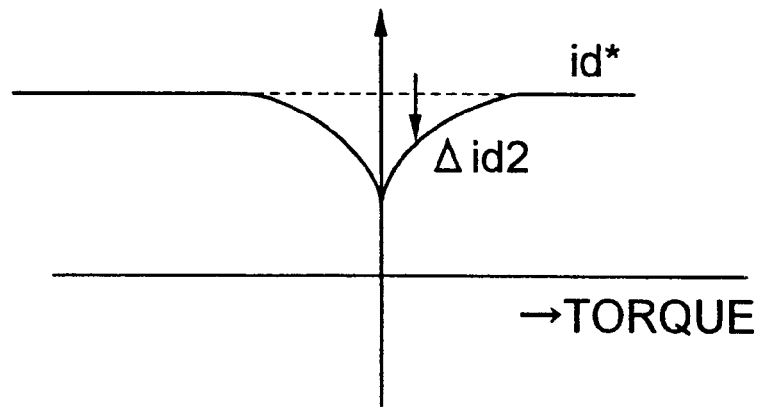
FIG. 9 is a diagram useful for explaining the operation of the apparatus shown in FIG. 8.

FIG. 8 illustrates still another embodiment of the present invention. The difference with the embodiments shown in FIGS. 1 and 5 lies in that id* is made variable in accordance with the torque in the zero speed range, and FIG. 9 shows the relationship between id* and the torque. In the embodiments shown in FIGS. 1 and 5, since id* is fixed irrespective of the relative magnitude of the torque, id* becomes more than necessary during a light load, so that the motor loss (copper loss) increases by that margin. For this reason, it is preferable to decrease the inverter output current during a low torque.

Figure 10:
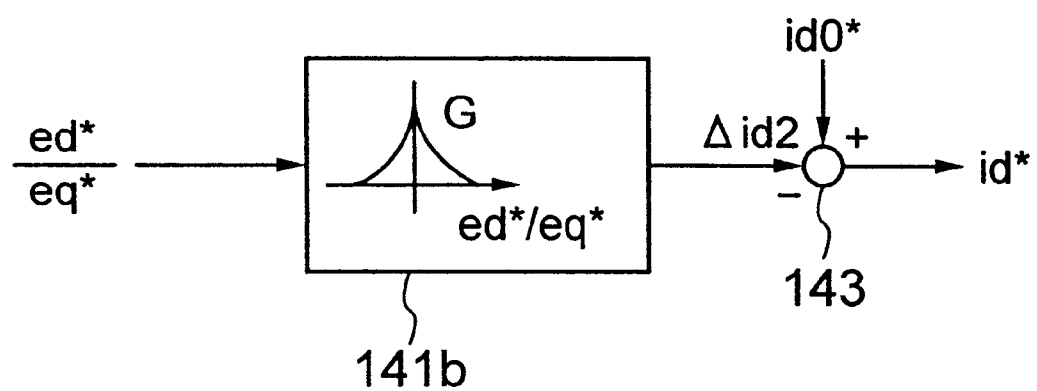
FIG. 10 is a diagram useful for explaining the content of an arithmetic operation by a d-axis current commanding unit in the apparatus shown in FIG. 8.

The content of the arithmetic operation by a current commanding unit 14b in this embodiment is shown in FIG. 10. Reference numeral 19 denotes a computing unit (divider) which generates a ratio ed*/eq*. The computation shown in the following Formula (8) is performed by a function generator 141b and the adder 143 by using ed*/eq* from the computing unit 19, which is a value corresponding to the slip (torque) of the motor, and id* having the relationship shown in FIG. 9 is outputted.

$$id^* = id0^* - \Delta id2 \quad (8)$$
$$= id0^* - G(ed^*/eq^*)$$

where id0* is a reference value corresponding to a maximum torque.

The configuration of constituent elements other than the current commanding unit 14b and the computing unit 19 is the same as that of the embodiment shown in FIG. 1, and their operation is also the same.

Figure 11:
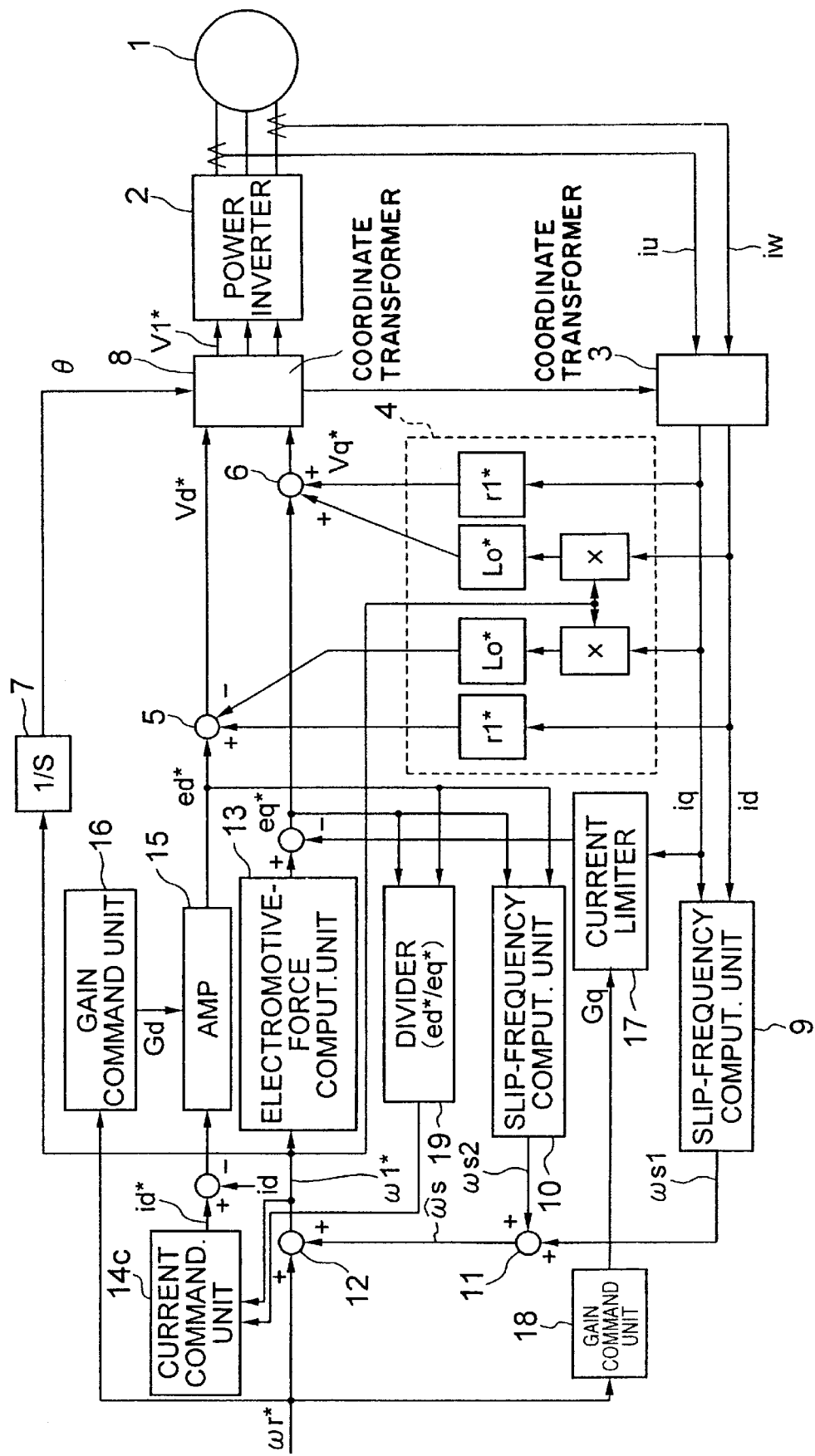
FIG. 11 is a block diagram of the vector controlling apparatus without a speed sensor for realizing the speed controlling method for an induction motor in accordance with a further embodiment of the invention.
Figure 12:
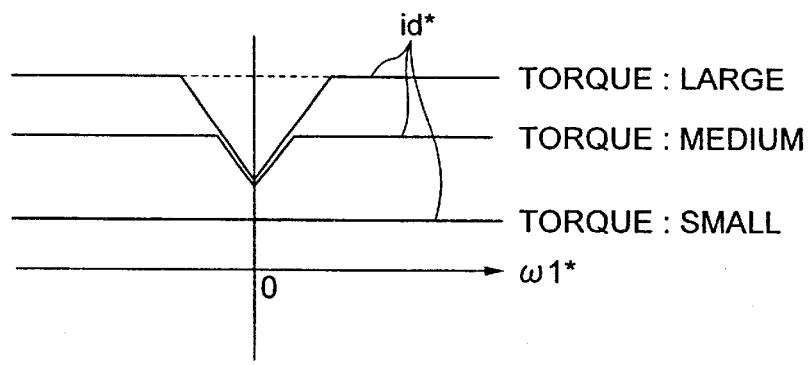
FIG. 12 is a diagram useful for explaining the operation of the apparatus shown in FIG. 11.

FIG. 11 illustrates a further embodiment of the present invention. In this embodiment, id* is varied in accordance with ω1* and the torque in the zero speed range. FIG. 12 shows the relationship among id*, ω1*, and the torque.

Figure 13:
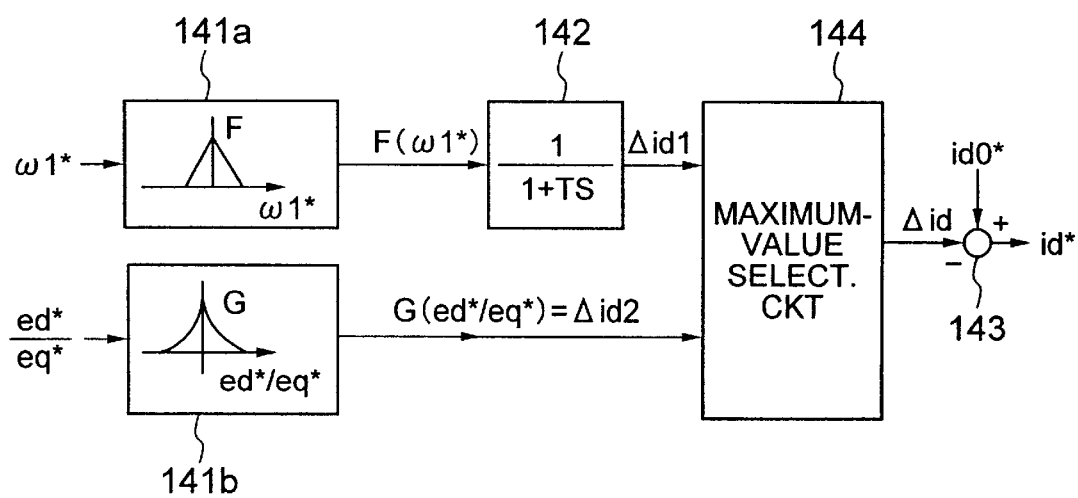
FIG. 13 is a diagram useful for explaining the content of an arithmetic operation by a d-axis current commanding unit in the apparatus shown in FIG. 11.
Figure 14:
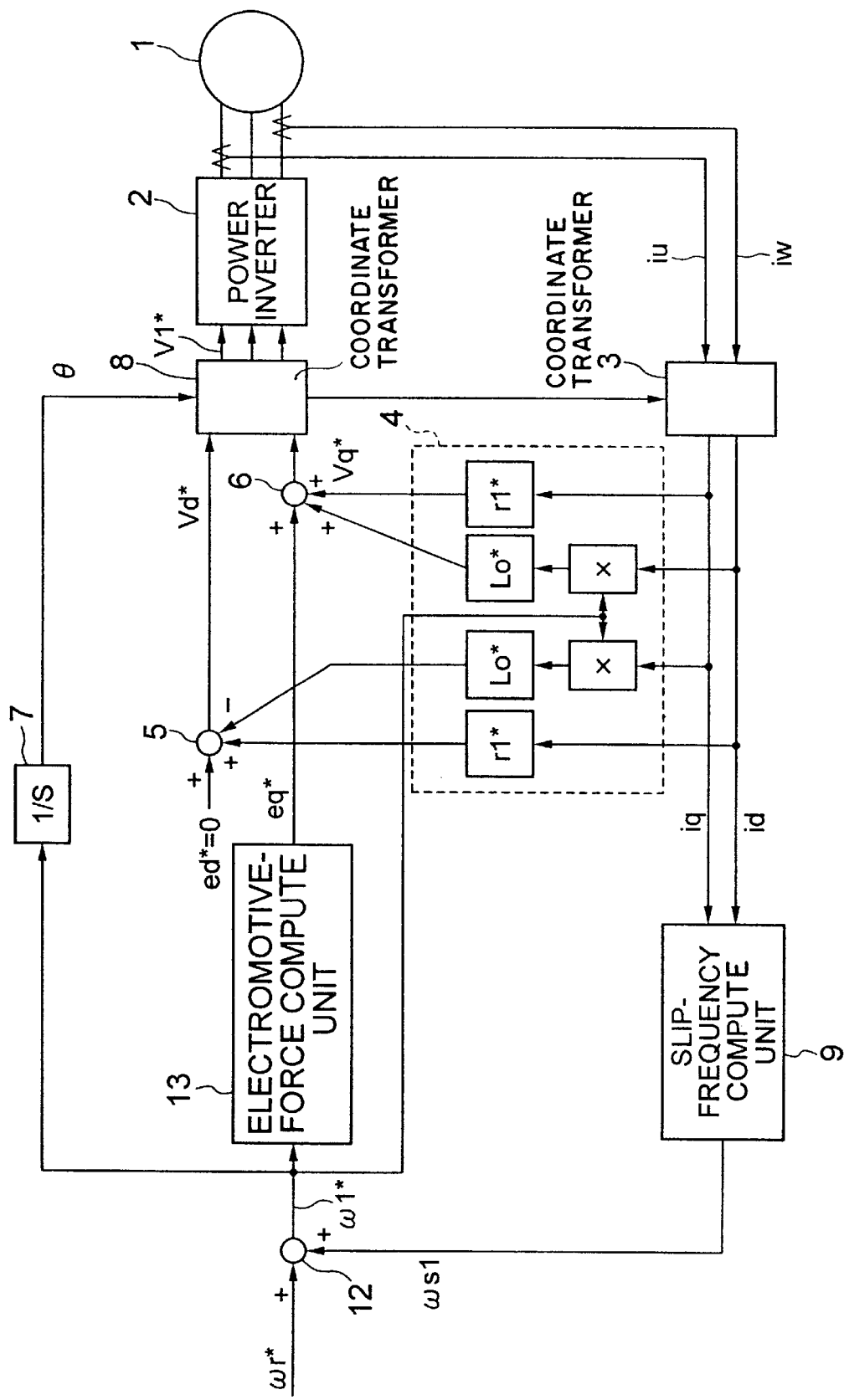
FIG. 14 is a block diagram illustrating the configuration of a conventional speed controlling apparatus for an induction motor.

The content of the arithmetic operation by a current commanding unit 14c in this embodiment is shown in FIG. 13. The function generators 141a and 141b and the delay circuit 142 are similar to those of the above-described embodiments. Their outputs Δid1 and Δid2 are added to a maximum-value selecting circuit 144, and a greater one of these values is outputted as Δid. Further, id* is computed in accordance with Formula (9). Consequently, id* changes in conformity with FIG. 12.

The configuration of constituent elements other than the current commanding unit 14c and the computing unit 19 is the same as that of the embodiment shown in FIG. 1, and their operation is also the same.

$$Id^* = id0^* - \Delta id \quad (9)$$

It should be noted that, in the same way as the above-described embodiments, as for ed*/eq* from the computing unit 19, i.e., the input signal of the function generator 141b, in the range where φ2d does not change greatly, eq* can be regarded as being proportional to ω1*, so that the computation can be performed by using ω1* instead of eq*. In addition, it is possible to use not only ω1* but also ωr*.

As described above, in accordance with the above-described embodiments, even in cases where there are variations in the motor parameters, speed control of an induction motor can be effected stably in its regenerative operation as well.

What is claimed is:

1. A speed controlling method for controlling an induction motor by a power inverter, comprising the steps of:

controlling an output voltage and an output frequency of said inverter in accordance with a speed command or a frequency command; and if a value of the speed command or the frequency command is equal to or less than a set value, increasing a d-axis current to a value greater than a normal value, correcting a q-axis voltage command value in accordance with a detected value of a q-axis current, and controlling the q-axis current in a direction in which the q-axis current is suppressed.

2. The speed controlling method for controlling an induction motor according to claim 1, wherein if the value of the speed command or the frequency command is equal to or less than the set value, and the command value is in a vicinity of zero, a d-axis current command value is decreased.

3. The speed controlling method for controlling an induction motor according to claim 1, wherein if the value of the speed command or the frequency command is equal to or less than the set value, a d-axis current command value is controlled by being changed in accordance with a value of a d-axis voltage command for said inverter, which is a d-axis induced electromotive force command.

4. The speed controlling method for controlling an induction motor according to claim 1, wherein if the value of the speed command or the frequency command is equal to or less than the set value, a d-axis current command value is controlled by being changed in accordance with a ratio between a value of a d-axis voltage command for said inverter, which is a d-axis induced electromotive force command, and the value of the q-axis voltage command, which is a q-axis induced electromotive force command.

5. The speed controlling method for controlling an induction motor according to claim 1, wherein if the value of the speed command or the frequency command is equal to or less than the set value, the d-axis current is decreased when the frequency command value is in a vicinity of zero, and a d-axis current command value is controlled by being changed in accordance with a d-axis voltage command, which is a d-axis induced electromotive force command.

6. The speed controlling method for controlling an induction motor according to claim 1, wherein if the value of the speed command or the frequency command is equal to or less than the set value, the d-axis current is decreased when the frequency command value is in a vicinity of zero, and a d-axis current command value is controlled by being changed in accordance with a ratio between a value of a d-axis voltage command, which is a d-axis induced electromotive force command, and the value of the q-axis voltage command, which is a q-axis induced electromotive force command.

7. A speed controlling method for controlling an induction motor by a power inverter, comprising the steps of:

controlling an output voltage and an output frequency of said inverter in accordance with a speed command or a frequency command; and adding a value corresponding to a d-axis voltage command for said inverter, which is a d-axis induced electromotive force command, to a value of the speed command or the frequency command, and correcting the command value.

8. A speed controlling method for controlling an induction motor by a power inverter, comprising the steps of:

controlling an output voltage and an output frequency of said inverter in accordance with a speed command or a frequency command; and adding a value corresponding to a ratio between a value of a d-axis voltage command for said inverter, which is a d-axis induced electromotive force command, and a value of a q-axis voltage command, which is a q-axis induced electromotive force command, to a value of the speed command or the frequency command, and correcting the command value.

9. A speed controlling method for controlling an induction motor by a power inverter, comprising the steps of:

controlling an output voltage and an output frequency of said inverter in accordance with a speed command or a frequency command;

if a value of the speed command or the frequency command is equal to or less than a set value, increasing a d-axis current to a value greater than a normal value, correcting a q-axis voltage command value in accordance with a detected value of a q-axis current, and controlling the q-axis current in a direction in which the q-axis current is suppressed; and adding a value corresponding to a d-axis voltage command for said inverter, which is a d-axis induced electromotive force command, to a value of the speed command or the frequency command, and correcting the command value.

10. The speed controlling method for controlling an induction motor according to claim 9, wherein if the value of the speed command or the frequency command is equal to or less than the set value, and the command value is in a vicinity of zero, a d-axis current command value is decreased.

11. The speed controlling method for controlling an induction motor according to claim 9, wherein if the value of the speed command or the frequency command is equal to or less than the set value, a d-axis current command value is controlled by being changed in accordance with a value of the d-axis voltage command for said inverter, which is the d-axis induced electromotive force command.

12. The speed controlling method for controlling an induction motor according to claim 9, wherein if the value of the speed command or the frequency command is equal to or less than the set value, a d-axis current command value is controlled by being changed in accordance with a ratio between a value of the d-axis voltage command for said inverter, which is the d-axis induced electromotive force command, and the value of the q-axis voltage command, which is a q-axis induced electromotive force command.

13. The speed controlling method for controlling an induction motor according to claim 9, wherein if the value of the speed command or the frequency command is equal to or less than the set value, the d-axis current is decreased when the frequency command value is in a vicinity of zero, and a d-axis current command value is controlled by being changed in accordance with the d-axis voltage command, which is the d-axis induced electromotive force command.

14. The speed controlling method for controlling an induction motor according to claim 9, wherein if the value of the speed command or the frequency command is equal to or less than the set value, the d-axis current is decreased when the frequency command value is in a vicinity of zero, and a d-axis current command value is controlled by being changed in accordance with a ratio between a value of the d-axis voltage command, which is the d-axis induced electromotive force command, and the value of the q-axis voltage command, which is a q-axis induced electromotive force command.

15. A speed controlling method for controlling an induction motor by a power inverter, comprising the steps of:

controlling an output voltage and an output frequency of said inverter in accordance with a speed command or a frequency command;

if a value of the speed command or the frequency command is equal to or less than a set value, increasing a d-axis current to a value greater than a normal value, correcting a q-axis voltage command value in accordance with a detected value of a q-axis current, and controlling the q-axis current in a direction in which the q-axis current is suppressed; and adding a value corresponding to a ratio between a value of a d-axis voltage command for said inverter, which is a d-axis induced electromotive force command, and the value of the q-axis voltage command, which is a q-axis induced electromotive force command, to the value of the speed command or the frequency command, and correcting the command value.

16. The speed controlling method for controlling an induction motor according to claim 15, wherein if the value of the speed command or the frequency command is equal to or less than the set value, and the command value is in a vicinity of zero, a d-axis current command value is decreased.

17. The speed controlling method for controlling an induction motor according to claim 15, wherein if the value of the speed command or the frequency command is equal to or less than the set value, a d-axis current command value is controlled by being changed in accordance with the value of the d-axis voltage command for said inverter, which is the d-axis induced electromotive force command.

18. The speed controlling method for controlling an induction motor according to claim 15, wherein if the value of the speed command or the frequency command is equal to or less than the set value, a d-axis current command value is controlled by being changed in accordance with the ratio between the value of the d-axis voltage command for said inverter, which is the d-axis induced electromotive force command, and the value of the q-axis voltage command, which is the q-axis induced electromotive force command.

19. The speed controlling method for controlling an induction motor according to claim 15, wherein if the value of the speed command or the frequency command is equal to or less than the set value, the d-axis current is decreased when the frequency command value is in a vicinity of zero, and a d-axis current command value is controlled by being changed in accordance with the d-axis voltage command, which is the d-axis induced electromotive force command.

20. The speed controlling method for controlling an induction motor according to claim 15, wherein if the value of the speed command or the frequency command is equal to or less than the set value, the d-axis current is decreased when the frequency command value is in a vicinity of zero, and a d-axis current command value is controlled by being changed in accordance with the ratio between the value of the d-axis voltage command, which is the d-axis induced electromotive force command, and the value of the q-axis voltage command, which is the q-axis induced electromotive force command.

* * * * *

UNITED STATES PATENT AND TRADEMARK OFFICE
CERTIFICATE OF CORRECTION

PATENT NO. : 6,300,741 B1
DATED : October 9, 2001
INVENTOR(S) : Okuyama

It is certified that error appears in the above-identified patent and that said Letters Patent is hereby corrected as shown below:

<u>Title page,</u>
Item [30],

-- [30] Foreign Application Priority Data
Feb. 24, 2000   (JP) ………………….. 2000-052256

Signed and Sealed this

Thirteenth Day of August, 2002

*Attest:*

JAMES E. ROGAN
*Attesting Officer*   *Director of the United States Patent and Trademark Office*